United States Patent
Ebinger et al.

(10) Patent No.: US 6,508,491 B1
(45) Date of Patent: Jan. 21, 2003

(54) EXHAUST MANIFOLD CLAMP WITH VIBRATION DISCONNECTING EFFECTS FOR FLANGE CONNECTIONS IN EXHAUST LINES AND METHOD OF MAKING SAME

(75) Inventors: Guenther Ebinger, Schwenninger Strasse 22, D-71522 Backnang (DE); Alexander Roser, Mutlangen (DE)

(73) Assignee: Guenther Ebinger, Backnang (DE)

( * ) Notice: Subject to any disclaimer, the term of this patent is extended or adjusted under 35 U.S.C. 154(b) by 9 days.

(21) Appl. No.: 09/708,518

(22) Filed: Nov. 9, 2000

(51) Int. Cl.$^7$ ............................................. F16L 27/10
(52) U.S. Cl. .................... 285/223; 285/337; 285/364; 285/406; 285/414
(58) Field of Search .................. 285/19, 337, 363, 285/364, 405, 406, 414, 223; F01N 7/08

(56) References Cited

U.S. PATENT DOCUMENTS

| | | | | |
|---|---|---|---|---|
| 2,548,404 A | * | 4/1951 | Sobel et al. ................ | 403/337 |
| 3,881,753 A | * | 5/1975 | Bochory .................... | 285/114 |
| 4,037,859 A | * | 7/1977 | Clements ................... | 285/364 |
| 5,228,729 A | * | 7/1993 | McElroy et al. ............ | 285/319 |
| 5,738,384 A | * | 4/1998 | Boehme ..................... | 285/114 |
| 5,873,609 A | | 2/1999 | Abthoff et al. | |
| 6,250,693 B1 | * | 6/2001 | Gensert et al. ............. | 285/364 |

FOREIGN PATENT DOCUMENTS

| | | |
|---|---|---|
| DE | 26 14 477 | 10/1977 |
| DE | 35 03 148 | 8/1986 |
| DE | 43 17 256 | 12/1994 |
| DE | 44 44 550 | 6/1996 |
| DE | 196 46 125 | 5/1998 |
| DE | 197 28 973 | 1/1999 |
| DE | 19752281 A1 * | 6/1999 |
| DE | 19964221 A1 * | 6/2001 |
| DE | 19964222 A1 * | 6/2001 |
| DE | 19964223 A1 * | 6/2001 |
| DE | 10015028 C1 * | 9/2001 |
| DE | 10015029 C1 * | 9/2001 |

* cited by examiner

Primary Examiner—Lynne H. Browne
Assistant Examiner—Aaron Dunwoody
(74) Attorney, Agent, or Firm—Crowell & Moring LLP

(57) ABSTRACT

A vibration-decoupling flange connection in an exhaust gas pipeline of motor vehicles includes flanges pretensioned by means of a tensioning device with springy means so as at least to swivel and to seal on a position, corresponding to a precalculated position of pipe members to be connected. The tensioning device is mounted when the exhaust gas pipe is closed and forms a clamp. The clamp legs of the clamp overlap under pretension the opposite flange sides with clamp curves of the clamp legs and extend over a circumferential angle of more than 180 degrees. The clamp curves exhibit supports, spaced in the circumferential direction. The clamp legs are separate components, which, when fitted together, can be fixed in position relative to each other by locking.

12 Claims, 2 Drawing Sheets

EXHAUST MANIFOLD CLAMP WITH VIBRATION DISCONNECTING EFFECTS FOR FLANGE CONNECTIONS IN EXHAUST LINES AND METHOD OF MAKING SAME

BACKGROUND AND SUMMARY OF THE INVENTION

The invention relates to a vibration-decoupling flange connection in the exhaust gas pipeline of motor vehicles said connection including flanges pretensioned by means of a tensioning device with springy means so as to swivel and/or seal on a position, corresponding to a precalculated position of the pipe members to be connected, the tensioning device being mounted when the exhaust gas pipe is closed and forming a clamp, whose clamp legs overlap under pretension the opposite flange sides with their clamp curves, extending over a circumferential angle of more than 180 degrees, and the clamp curves exhibiting supports, spaced in the circumferential direction.

Vibration-decoupling flange connections are known from everyday practice and are provided in particular between the parts of the exhaust gas pipeline that are linked together with articulation so as to seal. Such flange connections are subjected to some extent to significant forces, since the exhaust gas pipe is coupled with the engine of the vehicle and forms a "lever", which projects beyond the engine and is braced, like the engine, so as to move elastically relative to the frame or the chassis of the vehicle and thus contributes to the stabilization of the engine's position inside the vehicle. The engine must be stabilized with respect to the internal motoric forces and torques, driving torques and forces of gravity. This situation necessitates, on the one hand, a correspondingly stable design of the flange connection and, on the other hand, a design that compensates up to a certain degree for the angle errors and assembly tolerances and that can reduce both the effects of the vibrations of the exhaust gas system and the effects of the exhaust gas system-initiated vibrations and the Ferraria effect. To achieve in this respect a specific decoupling in the flange connection, said flange connection is braced by springy means.

To this end, the DE 44 44 550 A1 (corresponding U.S. Pat. No. 5,873,609) discloses the use of disk spring-like tensioning elements, which envelop the flanges over their periphery and, therefore, cannot be used in the closed exhaust gas pipeline. These tensioning elements are connected in turn to a tensioning device with suitable pretensioning. In so doing, the connection is produced by means of cover plates, which extend in the direction of the exhaust gas pipeline and are one piece with one of the tensioning elements and can be hooked relative to the other tensioning elements, so that the degree of elastic flexibility depends primarily on the spring hardness of the disk spring-like, annularly closed tensioning elements. Such tensioning devices are, to be sure, satisfactory in their function, but necessitate a relatively high demand for expensive spring steel and cannot be used at all in the closed exhaust gas pipeline, so that, for example, damage or failure of the tensioning elements incurs high repair costs. In addition, the totally enveloping construction also necessitates a relatively large space requirement, so that, despite the functionally quite satisfactory result of such tensioning devices there is a demand for tensioning devices that can be used in turn in the closed exhaust gas pipeline.

Also not to be used in the closed exhaust gas pipeline are multipart pipe connections, according to the DE 196 46 125 A1, where there is a centering ring, which acts between the pipe ends to be connected. Said centering ring lies in an enveloping jacket casing tube, which is spaced radially from the pipe ends to be connected and rests against the sets of sealing rings, which can be inserted axially into the annular slit to the jacket casing tube and spreads apart radially under tension. Axial bracing is produced by tensioning rings, which can be inserted into the jacket casing tube from both face sides and locked relative to the jacket casing tube.

Tensioning devices for the closed exhaust gas pipeline, known from the DE 197 28 973 A1, are designed as one piece, U-shaped tensioning clamps, whose curved clamp legs are connected together with a web in their crown area and pass over freely in the shape of a fork into two arms on the opposite side. Since the clamp curves are slid on from the side, these clamp curves of the clamp legs surround the exhaust gas pipeline on both sides. In so doing, the clamp legs rest against one of the opposite flange sides. The flanges to be secured in position are stressed by means of the respective arms of the clamp legs in tensioning areas, which are moved in the longitudinal direction of the arms. In the respective tensioning area, the arms exhibit as a support a recess or the like, by means of which a passage, which is also necessary for the spring effect, is achieved between the respective flange and the arm, braced against said flange.

In another vibration-decoupling flange connection (DE 35 03 148 C2) the tensioning device is formed by single, split annular spring elements, whose opposite ends, assigned to their severing point, rest against the opposite sides of the flanges to be connected together and brace them axially relative to each other. In the case of this solution the choice of such annular spring elements and their distribution along the flange periphery allow for significant flexibility with respect to the size and the distribution of the tensioning forces along the periphery of the flange connection. Yet with such a design the assembly time is significant, especially since there is the option of installing annular springs of different tensioning force, and the distribution of the annular springs over the periphery can vary. In addition, such a solution also assumes suitable accessibility and adequate space for the relatively voluminous annular springs.

Furthermore, there exist flange connections (DE-OS 26 14 477; DE 43 17 256 C2), where the flanges to be connected form in their assembly position an annular collar, whose cross section is trapezoidal and which tapers off toward the outside. Said annular collar is held together by axially stressed tensioning elements or a pipe clamp, which is to be braced in the circumferential direction and exhibits suitably inclined flanks.

The object of the invention is to provide a vibration-decoupling flange connection of the class described in the introductory part. Under good assembly conditions, its tensioning device is characterized by low material consumption and simple manufacturability. If desired, it can also facilitate for single tensioning areas an individual determination of the tensioning force.

This object is achieved by an arrangement according to which the tensioning device exhibits, as a multipart constructed tensioning clamp, two separate clamp legs, which stress the opposite flange sides and can be fixed into position through locking in the joined together state. The use of separate clamp legs enables during production greater freedom at lower cost and also increases the assembly options, in that the locking means can also be achieved by means of a combined plug and lock connection. To this end, once the plug connection between the two clamp legs has been produced by swivelling the same relative to each other, the position can be fixed by locking. The clamp legs can be assigned appropriate plug tongues, which engage with the receiving openings of the cover plates. Furthermore, cover plates can be provided with suitable latches that engage with the counter piece. The invention also enables a locking in that the clamp legs are rotated alternatingly relative to each other.

As a multipart constructed tensioning clamp, the embodiment also affords expanded possibilities of distributing the tensioning forces, as desired, over the supports, and in particular by adapting the cross sections of the support-bearing areas of the clamp legs, in particular in assignment to the position of the locking connection.

Especially advantageous is a design of a clamp leg that is configured in the shape of a clamp curve and has three supports, of which two are assigned to the end regions of the arms, and one, to the crown area. For the support located in the crown area, the assignment to a support web is expedient. As a part of the web, which forms the crown area of a clamp leg and connects the clamp arms, said support web is cut free parallel to the web relative to said web. Said free cut up to and into the area of the attachments of the arms can be advantageous.

Other details and features of the invention will become apparent from the claims. Furthermore, the invention is explained below with other features with reference to the embodiments.

DETAILED DESCRIPTION OF THE DRAWINGS

FIGS. 8 to 11 are largely schematic drawings of sections of a subarea of an exhaust gas pipe 1 of a motor vehicle. In the illustrated subarea the exhaust gas pipe 1 comprises the pipe members 2, 3, which are formed, for the sake of an example, by pipe sections and exhibit the flanges 4, 5, exhibited in the end region. Said flanges are to be braced axially by means of a tensioning device, according to FIGS. 1 to 3 or 4 to 7, and are to be positioned relative to each other.

Figure 8:
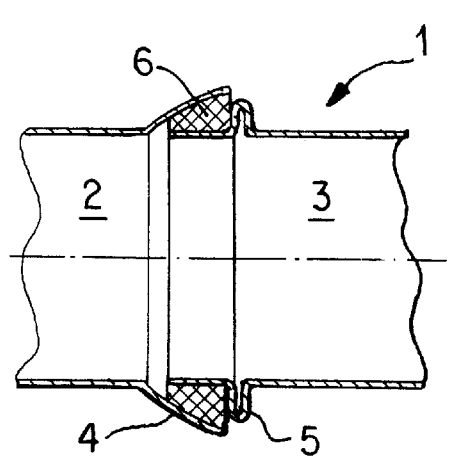
FIGS. 8 to 11 depict examples of flange configurations in the exhaust gas pipe of motor vehicles, to which the tensioning devices of the invention can be applied.
Figure 9:
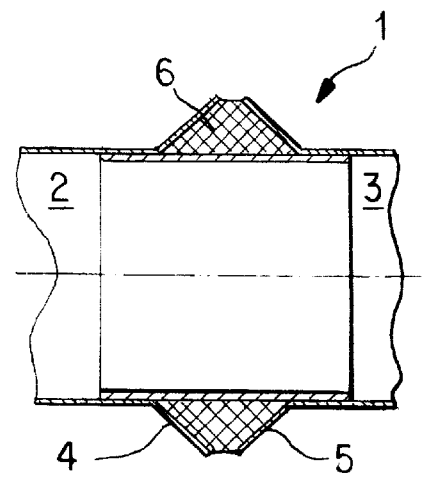
Figure 10:
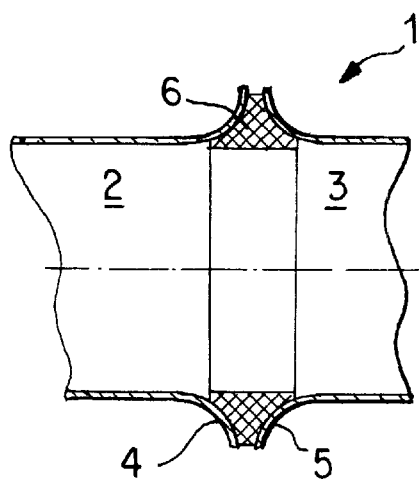
Figure 11:
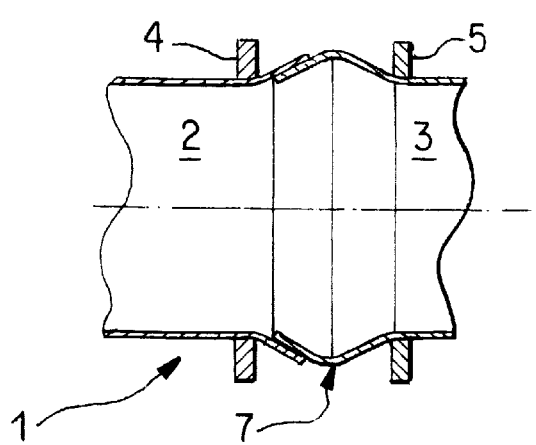

The flanges 4, 5 can be designed, as depicted in FIGS. 8 to 11, in different ways and can be braced against each other by means of seals 6 (FIGS. 8 to 10). Another design is shown in FIG. 11, where the flanges 4, 5 are designed as separate rings, which envelop the pipe members 2, 3 and are braced against correspondingly expanded areas of the pipe members 2, 3. The pipe members 2, 3, according to FIG. 11, form a sealing ball connection 7 in the overlapping area between the flanges 4, 5.

Figure 1:
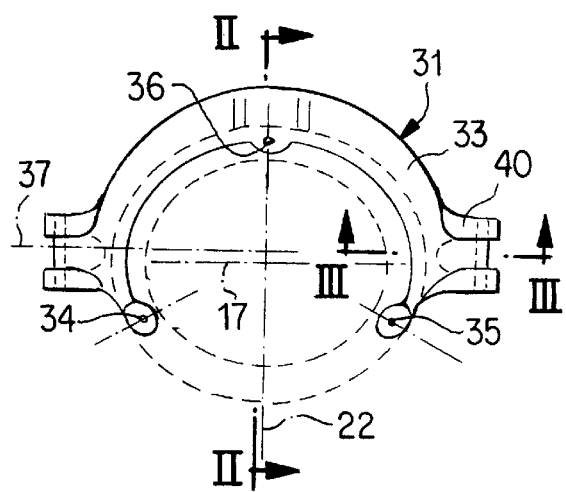
FIG. 1 depicts a first embodiment of a multipart, inventive tensioning clamp, which, as a tensioning device, is a component of a vibration-decoupling flange connection, and which exhibits two clamp legs, which belong to the tensioning areas and bear the supports and which can be braced in the tensioning direction and can be fixed in position relative to each other.
Figure 2:
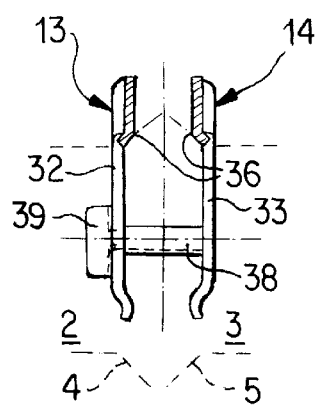
FIG. 2 is a simplified sectional view of a tensioning device of a flange connection along line II—II of FIG. 1, where the flanges and the parts, which bear said flanges and are indicated here as a pipe, are indicated with a dashed line.
Figure 3:
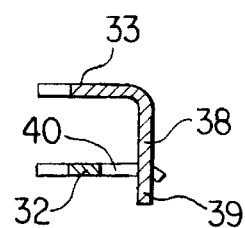
FIG. 3 is a sectional view along line III—III of FIG. 1.

In the case of a tensioning device 10, according to FIGS. 1 to 3, the tensioning clamp 31 is formed as multiple parts and comprises two clamp legs 13, 14, which are configured as clamp curves 32, 33 and enclose, based on FIGS. 8 to 11, the flanges 4, 5 over a circumferential angle of more than 180°, preferably about 240°. In a preferred uniform distribution in the circumferential direction of the clamp curves 32, 33, the clamp legs 13, 14 are assigned three support areas, provided with the supports 34, 35, and 36. Of these supports, the supports 34 and 35 are provided in the end areas of the arms of the clamp curves 32 and 33. Based on the approximately identical tensioning forces in the supports 34 and 35, the resulting tensioning force lies in a longitudinal center plane 22, which goes through the middle support 36. To lock the clamp legs 13 and 14 in position, it has been demonstrated that it is adequate to connect them at only two points, which lie on a plane 37, that is perpendicular to the longitudinal center plane 22 and into which the resultant of the tensioning forces, transferred by the supports 34 to 36, also runs.

Such a design leads to a very simple tensioning clamp 31, which requires very little processing time and, thus, very little material. Both clamp legs 13 and 14 can be locked in a simple manner, as shown especially in FIGS. 2 and 3, by means of locking connections. They are formed by cover plates 38 with head member 39 and tongues 40. One of the clamp legs, namely the clamp leg 14, exhibits the exhibited cover plates 38, which are bent down in the direction of the clamp leg 13, assigned to the other flange side, and in the braced state cross with their respective head member 39 the tongues 40, which project in the downward direction radially from the clamp curve 32 at a distance that is equivalent to the width of the cover plate 38.

The tensioning clamp 31 is, or the clamp curves 32, 33 of their clamp legs 13, 14 are, dimensioned in such a manner relative to the free distance between their supports 34, 35, provided in the end areas, that said tensioning clamp is equal to, preferably slightly less than, the diameter of the pipe members 2 or 3, which are overlapped by the respective clamp curve 32 or 33. The result is that the tensioning clamp 31 that is slid on the exhaust gas pipe 1 is fixed in position, despite the fact that said tensioning clamp is slid on from the side.

Suitable material for the tensioning clamp 31 is preferably spring steel plate. The free passage of the clamp curves 32 or 33 of the tensioning clamps 13, 14 relative to the neighboring flange side is guaranteed in that only the supports 34 to 36 exhibit contact with the respective flange side. Said free passage is essential to the spring effect of the tensioning clamp 31.

It is possible to determine the tensioning forces to be transferred for the supports 34 or 35, provided in the free end areas, by means of a cross sectional dimensioning of the arms of the clamp curves 32, 33. This feature can be realized for the support 36, located in the crown area (not shown in detail in FIG. 1), in that, as illustrated in FIG. 4 for the corresponding support 46, it is assigned to a support web, which is cut free parallel to the web and which runs between the arms of the respective clamp curve 32, 33 in the crown area.

Figure 4:
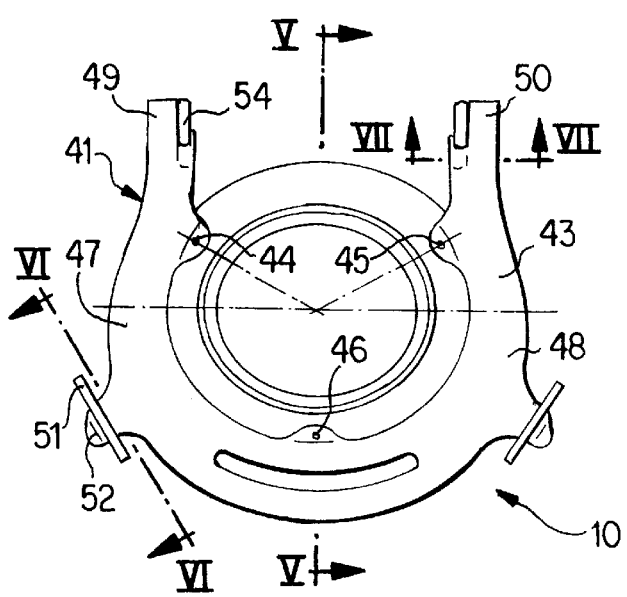
FIG. 4 depicts another embodiment of a multipart vibration-decoupling flange connection with clamp legs, which can be braced relative to each other and are curved when seen from the top.
Figure 5:
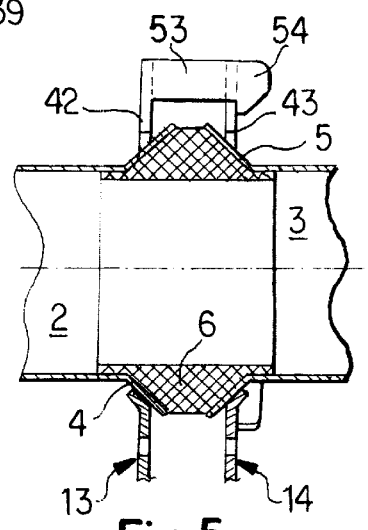
FIGS. 5 to 7 are sectional views, corresponding to the sectional view of FIG. 4 along lines V—V, VI—VI and VII—VII.

FIG. 4 is a top view of another embodiment of a tensioning device 10 with a multipart tensioning clamp 41; FIG. 5 shows its arrangement in the connection of the pipe members 2 and 3 with wedge-shaped seal 6 in its transition and with flanges 4, 5, which approach each other at a suitable angle. Braced against said flanges are the two clamp legs 13, 14 in the configuration as clamp curves 42 and 43 with their supports 44 to 46 in the respective tensioning areas. In the top view the clamp curves 42, 43 exhibit a U-shaped basic shape. The supports 44 to 46, assigned to said clamp curves, are distributed uniformly over the periphery of the respective pipe member at an angular distance of about 120° so that the support 46 lies between the arms 47 and 48 of the respective clamp curve 42 or 43 in the crown area. The supports 44 and 45 lie in the transition to a bulging end region 49 or 50 of the respective arm 47 or 48, where the end members of the arms 47 and 48 that project beyond the flanges 4, 5 are called the bulging end area 49, 50.

With this solution, too, the clamp legs 13 and 14 in the shape of clamp curves 42 and 43 can be produced as essentially flat spring elements, which stress from opposite sides the flanges 4 and 5 over the supports 44 to 46 and, braced relative to each other, form a springy support for the flanges 4 and 5. The clamp curves 42 and 43, forming the clamp legs 13, 14, are braced relative to each other once in the end areas 49, 50 of the arms 47 and 48 and secondly in the opposite crown area of the clamp curves 42, 43. As an alternative to the arrangement shown here, another design is also possible, wherein the clamp legs 13, 14 in the shape of clamp curves 42, 43, whose shape is altogether symmetrical, can be connected in the crown area by means of a mounting located in this plane of symmetry.

Figure 6:
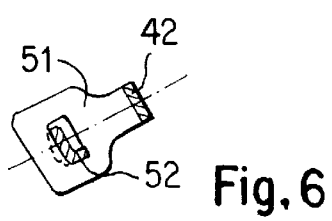
Figure 7:
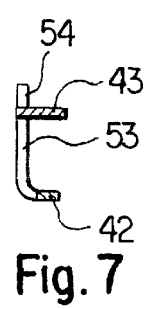

In the embodiment, as shown in FIG. 4 in conjunction with FIG. 6, the tensioning mountings, lying opposite the end areas 49, 50 of the arms 47, 48, are formed by cover plates 51, which are bent down and bulge on the peripheral side from the clamp curve 42 of the clamp leg 13. The head side of said plates exhibits recesses, into which the plug tongues 52, provided on the clamp curve 43 of the clamp leg 14, are to be threaded. If the two clamp legs 13, 14 are connected in this manner in their crown sided area of their clamp curves 42, 43, the arms 47 or 48, belonging to the clamp legs 13 or 14, can be swivelled so as to brace the flanges 4 and 5 relative to each other until the angular cover plates 53, provided in the end areas 49, 50 of the arms 47, 48 of the clamp curve 42, overlap and engage with their hook-shaped head members 54 the clamp curve 43 and thus guarantee the spring tension that is built up by swivelling together the clamp legs 12 and 13.

The supports can also be formed here by the tongues, which start from the respective clamp curve and lie in the transition to the flange, so that the ratio of the tensioning forces in the individual supports can also be influenced by specifying the tongue cross section. With such tongues the free passage between the flange and the clamp curve of the clamp leg can also be guaranteed to an extent that is adequate for spring movements.

In an advantageous further development (not illustrated here), the clamp legs can also be locked by twisting relative to each other. The twisting can be done, based on FIG. 1 as an example, by means of mutual rotation of the clamp legs around the longitudinal axis of the pipeline. To this end, for example, a clamp curve of a clamp leg—based on a supporting area—is assigned a receptacle, with which the other clamp leg must be made to engage with a plug element through rotation of the clamp legs relative to each other. This object can be achieved, for example, in that the cover plates of different diameters are rolled in on the end side so that the one cover plate engages as the "roller pin" with the other cover plate as the slit "roller sleeve". A simple connection for the clamp legs to be braced by rotation relative to each other can also be achieved through vertical adjustment of the abutting surfaces, of which one is assigned to each cover plate and which can be made to overlap through rotation of the clamp legs relative to each other. In so doing, it is also possible to arrange the abutting surfaces so as to be angular so that with increasing overlap an increasing tensioning force is associated. The corresponding locking procedure makes it easy to lock and secure such cover plate connections.

The invention discloses embodiments of tensioning devices for vibration-decoupling flange connections in the exhaust gas pipe of motor vehicles. Said embodiments make it possible to meet very different demands relating to design and function. The envisaged multipart solution is especially advantageous with respect to a lower cost of production. The advantage of retrofitability or assembly without interfering with the exhaust gas pipe makes the inventive flange connection interesting, especially as a repair solution. In this respect the construction with respect to the arrangement of the support areas offers extensive free space, which enables adaptation to the respective vibration and load conditions and thus also leads to good results with respect to the strength of the flange connection and its vibration-decoupling effect.

What is claimed is:

1. Vibration-decoupling flange connection in an exhaust gas pipeline of motor vehicles, said connection including flanges pretensioned by means of a tensioning device with springy means so as at least to swivel and to seal on a position, corresponding to a precalculated position of pipe members to be connected, the tensioning device being mounted when the exhaust gas pipe is closed and forming a clamp, whose clamp legs overlap under pretension the opposite flange sides with clamp curves of the clamp legs, extending over a circumferential angle of more than 180 degrees, and the clamp curves exhibiting supports, spaced in the circumferential direction,
   wherein the clamp: legs are separate components, which, when fitted together; can be fixed in position relative to each other by locking, and
   wherein a locking connection comprises a tensioning plate, which is bent down from a clamp leg and which can be locked relative to a supporting tongue, provided on the other clamp leg.

2. Vibration-decoupling flange connection in an exhaust gas pipeline of motor vehicles, said connection including flanges pretensioned by means of a tensioning device with springy means so as at least to swivel and to seal on a position, corresponding to a precalculated position of pipe members to be connected, the tensioning device being mounted when the exhaust gas pipe is closed and forming a clamp, whose clamp legs overlap under pretension the opposite flange sides with clamp curves of the clamp legs, extending over a circumferential angle of more than 180 degrees, and the clamp curves exhibiting supports, spaced in the circumferential direction,
   wherein the clamp legs are separate components, which, when fitted together, can be fixed in position relative to each other by locking, and
   wherein with a U-shape of the clamp curves and symmetrical arrangement of the locking connections, the clamp legs are braced relative to each other in end areas of clamp arms and in an opposite crown area.

3. Vibration-decoupling flange connection, as claimed in claim 2, wherein the clamp curves are designed symmetrically to a bisector, and wherein locking means are provided which comprise two locking connections, which lie on a straight line at right angles to the bisector and lie opposite each other, based on the bisector.

4. Vibration-decoupling flange connection, as claimed in claim 3,
    wherein the straight line, on which the locking connections lie, intersects the sum of the tensioning forces, transferred by means of the supports.

5. Vibration-decoupling flange connection, as claimed in claim 2,
    wherein the clamp legs have respective additional locking connections in the crown area of the clamp curves, the additional locking connections being opposite to the locking connections at the end areas of the clamp arms.

6. Vibration-decoupling flange connection, as claimed in claim 2,
    wherein the clamp legs have respective additional locking connections in the crown area of their clamp curves, the additional locking connections being in the plane of symmetry of the clamp curves.

7. Vibration-decoupling flange connection, as claimed in claim 2, wherein a cover plate, which is bent down and bulges on the peripheral side from the clamp leg, is provided as the locking connection assigned to the crown area, said cover plate exhibiting a head-sided recess, into which a plug tongue, starting from the other clamp leg, reaches.

8. Vibration-decoupling flange connection in an exhaust gas pipeline of motor vehicles, said connection including flanges pretensioned by means of a tensioning device with springy means so as at least to swivel and to seal on a position, corresponding to a precalculated position of pipe members to be connected, the tensioning device being mounted when the exhaust gas pipe is closed and forming a clamp, whose clamp legs overlap under pretension the opposite flange sides with clamp curves of the clamp legs, extending over a circumferential angle of more than 180 degrees, and the clamp curves exhibiting supports, spaced in the circumferential direction,
    wherein the clamp legs are separate components, which, when fitted together, can be fixed in position relative to each other by locking,
    wherein a tensioning force of the tensioning device for individual clamping areas is determined with respect to the support by means of the cross section of the clamp leg bearing the respective support, and
    wherein the support, assigned to a crown area of the clamp curve of a clamp leg, is provided on a support web, and wherein the support web is formed by a part of the web that is cut free parallel to the web, said web forming the crown area of a clamp leg and connecting the clamp arms.

9. A tensioning device for tensioning end flanges of two adjoining motor vehicle exhaust pipes toward one another, comprising:
    a first clamp leg having a clamp curve extendable in use over a circumferential angle of more than 180° with a first end flange of a first pipe, and
    a second clamp leg having a clamp curve extending in use over a circumferential angle of more than 180° with a second end flange of a second pipe,
    wherein the clamp curves each exhibit support sections engageable in use with a respective end flange to tension said end flanges toward one another,
    wherein the clamp legs are separate components which include respective interengageable locking components, and
    wherein said clamp legs are U-shaped, said interengageable locking components being disposed on respective arms of said U-shaped clamp legs.

10. A tension device according to claim 9, wherein, when said clamp legs are in an untensioned state, their arms are spaced from one another by an amount smaller than a diameter of flanges to be clamped, said clamp legs being elastically spread apart to engage, over said flanges in a radial direction and subsequently connected by said locking components.

11. A tension device according to claim 10, wherein each clamp leg includes at least two of said support sections engageable with a respective end flange.

12. A tension device according to claim 11, wherein each clamp leg includes three of said support sections, one support section at one side of a diametric plane through a center of said flanges and two support sections at an opposite side of said plane.

* * * * *